US008167506B2

(12) United States Patent
Martos

(10) Patent No.: US 8,167,506 B2
(45) Date of Patent: May 1, 2012

(54) PHOTOGRAPHING DEVICE IN PARTICULAR FOR VIDEO SURVEILLANCE AND WORKING METHODS OF SAME

(75) Inventor: François Martos, Tournefeuille (FR)

(73) Assignee: Mardel Image, Blagnac (FR)

( * ) Notice: Subject to any disclaimer, the term of this patent is extended or adjusted under 35 U.S.C. 154(b) by 457 days.

(21) Appl. No.: 11/910,268

(22) PCT Filed: Apr. 3, 2006

(86) PCT No.: PCT/FR2006/050291
§ 371 (c)(1),
(2), (4) Date: Mar. 23, 2008

(87) PCT Pub. No.: WO2006/106258
PCT Pub. Date: Oct. 12, 2006

(65) Prior Publication Data
US 2008/0181600 A1 Jul. 31, 2008

(30) Foreign Application Priority Data
Apr. 4, 2005 (FR) ..................................... 05 50870

(51) Int. Cl.
G03B 17/00 (2006.01)
(52) U.S. Cl. ....................................................... 396/427
(58) Field of Classification Search ........... 396/419–428
See application file for complete search history.

(56) References Cited

U.S. PATENT DOCUMENTS

| 4,945,367 | A | * | 7/1990 | Blackshear | 396/427 |
|---|---|---|---|---|---|
| 5,152,623 | A | | 10/1992 | Yamada et al. | |
| 5,153,623 | A | * | 10/1992 | Bouvier | 396/427 |
| 6,354,749 | B1 | * | 3/2002 | Pfaffenberger, II | 396/427 |
| 6,527,000 | B1 | * | 3/2003 | Randmae et al. | 134/99.1 |
| 6,591,064 | B2 | * | 7/2003 | Higashiyama et al. | 396/18 |
| 6,647,200 | B1 | * | 11/2003 | Tanaka | 386/46 |
| 7,209,176 | B2 | * | 4/2007 | Chapman | 348/373 |
| 2001/0045991 | A1 | * | 11/2001 | Van Rens et al. | 348/373 |
| 2002/0139394 | A1 | * | 10/2002 | Bronson | 134/6 |
| 2004/0223062 | A1 | | 11/2004 | Pettegrew et al. | |
| 2006/0072757 | A1 | * | 4/2006 | Renkis | 380/270 |

FOREIGN PATENT DOCUMENTS

| DE | 297 12 356 U1 | 9/1997 |
|---|---|---|
| DE | 100 44 717 A1 | 3/2002 |
| EP | 0 990 834 A | 4/2000 |
| EP | 1 081 953 A2 | 3/2001 |
| EP | 1 136 965 A | 9/2001 |
| EP | 1136965 A1 * | 9/2001 |

(Continued)

OTHER PUBLICATIONS

EP 1 136 965 A (ELBEX Video Ltd.), Sep. 26, 2001.

(Continued)

Primary Examiner — Clayton E Laballe
Assistant Examiner — Dennis Hancock
(74) Attorney, Agent, or Firm — Jackson Patent Law Office

(57) ABSTRACT

Disclosed is a device providing the control and movement of a camera. The device includes a housing configured to form a protective chamber around the camera, the housing being mounted mobile in rotation along a first axis with respect to an arm. The device further includes a first slip ring between the housing and the arm, and a second slip ring. Power for the camera is transmitted in the first and second slip ring.

15 Claims, 5 Drawing Sheets

Section B-B

FOREIGN PATENT DOCUMENTS

FR           2 789 253 A     8/2000
WO      WO 9812600 A1 *   3/1998

OTHER PUBLICATIONS

Preliminary Search Report (Rapport de Recherche Préliminaire), Jan. 10, 2006 of corresponding application in French Patent Office (INPI).

International Search Report, Aug. 25, 2006, from International Phase of the instant application.

English Translation of the Written Opinion of the International Search Authority, Oct. 4, 2007, from International Phase of the instant application.

English Translation of International Preliminary Report on Patentability Chapter I, Oct. 9, 2007, from International Phase of the instant application.

* cited by examiner

Section A-A

Section B-B

Section B-B

PHOTOGRAPHING DEVICE IN PARTICULAR FOR VIDEO SURVEILLANCE AND WORKING METHODS OF SAME

TECHNICAL FIELD OF THE INVENTION

This invention relates to the field of photographing using or not using a video technique, and in particular to adaptations making it possible to provide the operation of a mobile camera under the best conditions.

DESCRIPTION OF THE PRIOR ART

The prior art discloses a number of solutions for moving a camera, in particular a surveillance camera. These solutions can be classified into two categories: turrets and domes.

The applicant has noted that the existing solutions have a number of problems, including the following:
- cameras placed inside a protection dome have a reduced zooming capacity due to the presence of said dome. Indeed, beyond a certain focal distance, the objective of the camera will focus from the spherical cap of the concave surface of the dome;
- the cameras used on turrets are either stationary or move very slowly;
- the cameras used in domes cannot provide a view beyond the horizontal plane above or below which they are arranged;
- the effective use of the domes and cameras in general requires regular cleaning of their lens shields (planar surface) for turrets or their spherical cap for domes;
- cameras in domes or installed on turrets require a specialised installer for their installation.

Thus, for example, the French document 2 665 317 describes a video surveillance camera with an integrated support without a dome, which comprises a photographing device placed in a housing comprising a hollow cover constituted by a base and at least one gimbal arm on which a hollow shell, preferably spherical, rests. The photographing device is placed in the shell, with the connection wires passing from the shell to the inside of the cover through at least one hinge ensuring the mobility of the shell about an axis passing through its centre and perpendicular to the gimbal arm, and the cover itself being mobile about an axis perpendicular to the aforementioned axis and parallel to the gimbal arm.

This device has the disadvantage of not providing a solution to the management of data concerning the real positioning of the camera on its rotation axes. In addition, the use of hinges as wire passage means has the disadvantage of limiting the possibilities for rotation of the photographing modules to the twisting capacities of said wires. In addition, the photographing housing does not have means for protecting the objective of the camera that it contains. This document remains very vague with regard to the zooming capabilities of the camera. But the diameter of the field of view provided by such a device remains limited to said zooming capabilities.

The French document 2789253 describes a dome device for a video surveillance camera that is remarkable in that it comprises a protective cap called an ogive, which is not integrated with the shaft, but pivots with the camera, of which the view is provided through an optical window with a flat profile providing a view above the horizontal. The sealing of the lower rotary portion is provided with a lip seal or by a plate with a folded edge that dips into a groove filled with liquid.

While proposing a viewing window with a planar profile, allowing a view beyond the horizontal and preventing focusing on a spherical surface, this device requires a movement of the protective dome at the same time as the camera for its rotation according to a vertical axis. In addition, the spherical surface is located at the end of the ogive.

This document remains vague on the zooming capabilities of the camera as well as on the means for controlling its movements.

Another disadvantage noted in the devices of the prior art concerns the limitation of the number and type of photographing means implemented. Indeed, most devices provide the control and the movement of single photographing means of the conventional video type.

DESCRIPTION OF THE INVENTION

On the basis of this prior art, the applicant has conducted research in order to design a device implementing photographing means or a camera, in particular for video surveillance purposes, overcoming the disadvantages of the prior art.

The applicant focused on trying to achieve the various advantages seen separately in the devices of the prior art.

This research led to the design of a device providing the control and movement of at least one photographing means, remarkable in that it is constituted by a housing that, forming a protective chamber around at least one photographing means, is mounted mobile in rotation along a first axis with respect to at least one arm integrated with a plate that is itself mounted mobile in rotation along a second axis perpendicular to the first, with respect to a stationary base, wherein the two rotation movements occur over three hundred and sixty degrees without stopping, with the arrangement and size of the photographing means with respect to the arrangement and the size of the plate and the base defining a field of visibility of at least two hundred and seventy degrees.

This protective housing is therefore capable of rotating fully according to both a horizontal axis and a vertical axis. The camera has full rotational mobility according to two axes. Its visual field is limited only by the presence of the plate, of which the volume does not prevent the objective of the camera from going beyond the horizontal. Indeed, said plate is advantageously preformed so as not to form an obstacle when the objective of the camera exceeds the horizontal plane. The mobility enables the problems of speed of movement and difficulty of installation to be solved. It is thus no longer necessary to study the camera positioning very precisely in particular according to all of the ground slopes. The device can therefore be arranged right side up or upside down. This device also has no dome and is therefore not equipped with a dome support, which limits the field of view of the device according to an angle of 180° above or below the dome support according to its arrangement.

To make it possible to propose additional functionalities, the protective housing of the device of the invention can receive a plurality of photographing means of the same technology. This feature makes it possible to envisage instantaneous perimetric photographing without requiring a rotational movement. Similarly, according to another feature, the protective housing can receive a plurality of photographing means of different technologies, such as, for example, infrared or ultraviolet viewing means providing, for a single device, a plurality of viewing solutions.

Also for the sake of proposing additional functionalities, the applicant has considered certain applications in which the photographing means are associated in the protective housing with at least one sensor thus proposing the recording of non-visual parameters. The applications of such a device go beyond simple surveillance, and include, in particular: detection, monitoring, surveillance of processes, automation of surveillance, photographic recording, etc.

According to another feature of the invention, the device and the size of the photographing means with respect to the arrangement and size of the plate and base define a field of visibility that is at least two hundred and seventy degrees.

According to a particularly advantageous feature of the invention, the rotation movements are provided for each axis by a stepper motor and monitored for each axis by an encoder. Thus, the device works in a closed loop, i.e. it has functional elements necessary for recognising the various angular positions taken by the rotating sub-assemblies. In addition, such a position monitoring is entirely suitable for a much more precise control of the movements proposed by the device of the invention, which precision is on the order of one-tenth of a degree.

According to another particularly advantageous feature of the invention, said protective housing includes a window in front of which the objective of the photographing means is installed, which window is closed by a plate of transparent material. The use of a planar element to protect the objective of the photographing means avoids the disadvantages of the prior art, namely focusing on the protective spherical portions.

This feature makes it possible to envisage photographing means with zooming capabilities that are largely superior to what is normally provided for dome-type devices. Thus the zooming capabilities are limited only by the current technological limitations of on-board photographing devices. In addition, the device of the invention has been designed to receive the most recent photographing means, of which the zooming and precision capabilities are capable of increasing. Thus, according to another particularly advantageous feature, the zooming capability of the photographing means is at least, if not much greater than, twenty-five.

According to an alternative, said protective housing can receive a plurality of photographing means and is equipped with a plurality of windows in front of which the objective of the photographing means is installed, windows closed by a plate of material suitable for the type of photographing means. Indeed, according to the type of photographing means (conventional visual spectrum, infrared, ultraviolet, etc.), the protective window may not be protected by the same material.

Another particularly advantageous feature of the invention relates to its cleaning means. Indeed, the device of the invention is remarkable in that said plate includes, at the level of the base of the arm, at least one cleaning means. Thus, a method for operating the device consists of causing the protective housing to rotate so as to bring the viewing window to the level of the cleaning means in order to carry out the cleaning of the latter. The area toward which the photographing means are blind is therefore advantageously used to receive cleaning means.

According to another particularly advantageous feature of the invention, said plate is equipped at the base of the arm with projecting elements forming, with the external surface of the rotating housing, a protective chamber. Another method for operating the device consists of causing a rotation of the housing so as to bring the viewing window into said chamber so as to protect it.

Another operating method consists of integrating a legal locking and unlocking function for image hiding, which can be processed either locally (recorder on-board the device), or by a processing device at the request of the courts.

While the basic concepts of the invention have been disclosed in their most general form, other details and feature will become clearer on reading the following description, and in view of the appended drawings, given by way of a non-limiting example, an embodiment of a device and methods consistent with the invention.

DESCRIPTION OF PREFERRED EMBODIMENTS

Figure 1:
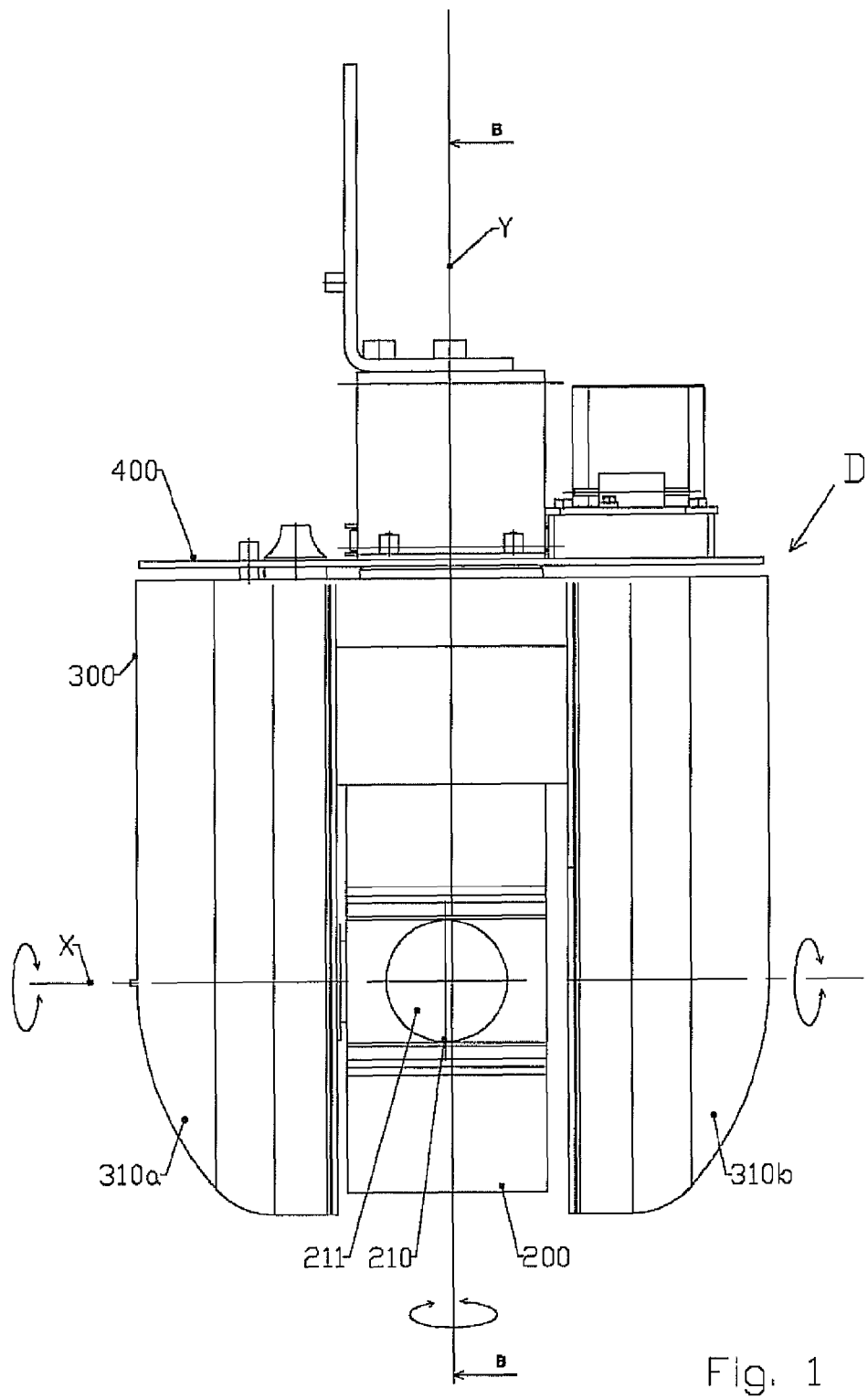
FIG. 1 is a diagrammatic drawing of an external frontal view of an embodiment of the device of the invention.
Figure 2:
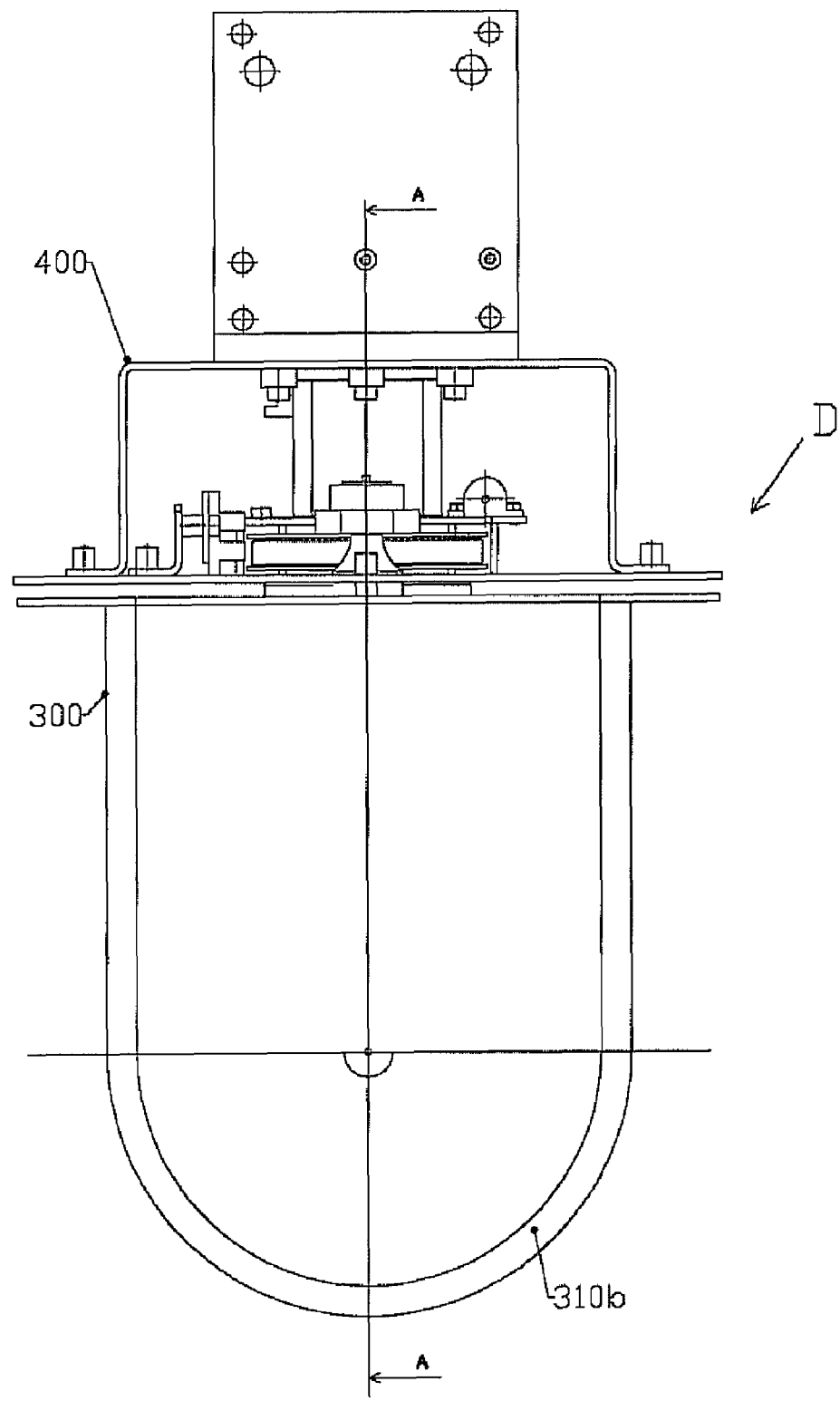
FIG. 2 is a diagrammatic drawing of an external side view of the device shown in FIG. 1.
Figure 3:
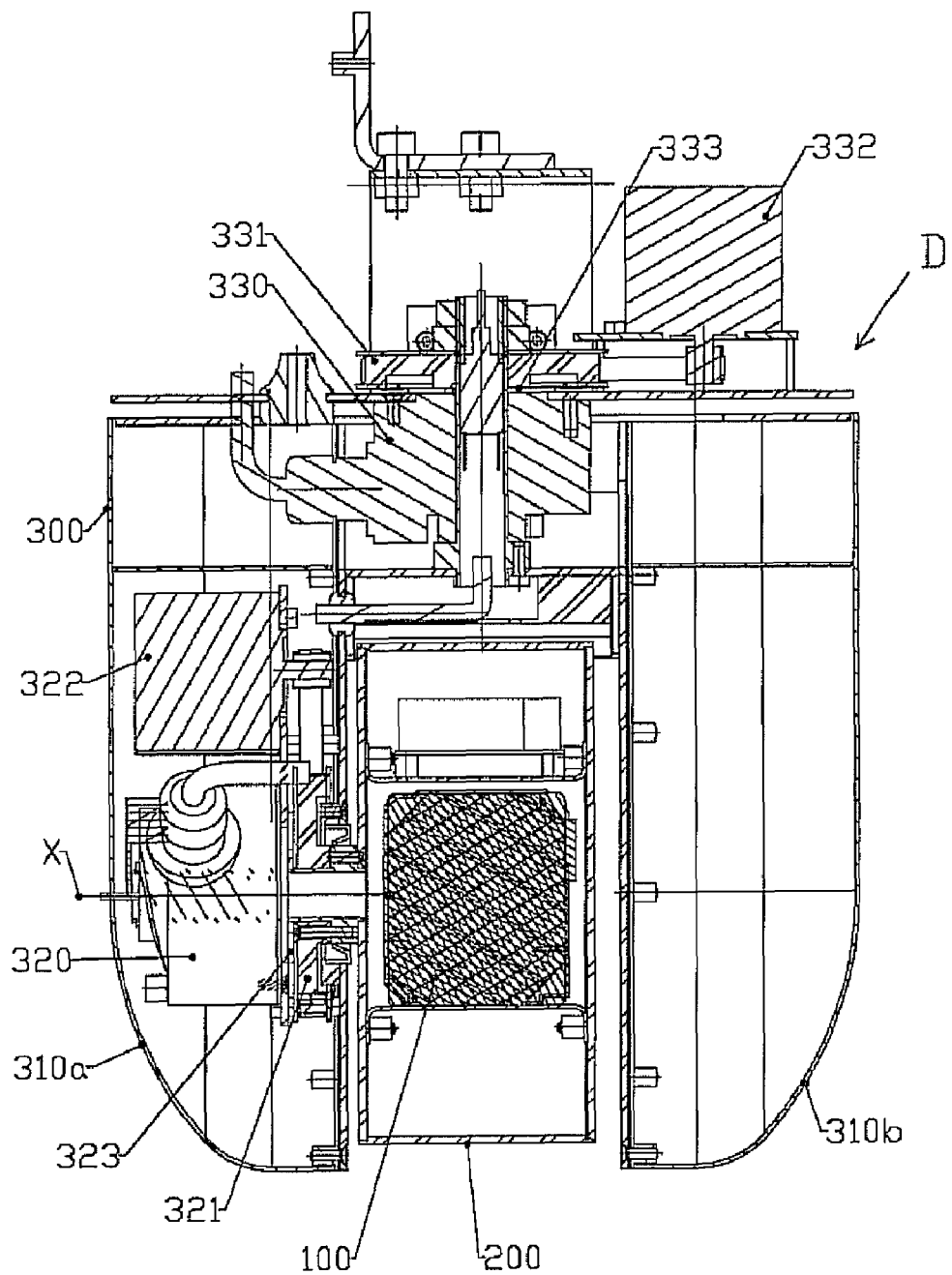
FIG. 3 is a diagrammatic drawing of a frontal cross-section view according to the cutting plane A-A shown in FIG. 2.

As shown in the drawings of FIGS. 1, 2, 3, 4 and 5, the device of the invention referenced D, which provides the control of the operation and movement of photographing means 100, is constituted by a protective housing 200 for said photographing means 100, which is mounted mobile in rotation along a first axis X with respect to at least one arm 310a integrated with a plate 300, which is mounted mobile in rotation along a second axis Y perpendicular to the first with respect to a stationary plate 400. As shown, the rotation on these two X- and Y-axes can be performed over 360 degrees without stopping.

According to the invention, and according to the embodiment shown, said plate 300 includes two arms 310a and 310b between which said protective housing 200 rotates. According to the technological choice shown, only one arm 310a alone provides the guidance and rotational movement of the protective housing according to the X-axis.

As shown, said protective housing 200 includes a window 210 in front of which the objective 110 of the photographing means 100 is installed. This window 210 is closed by a plate 211 of transparent material that in this case adopts a disk shape. The protective housing is therefore equipped with a window closed by a pane with a planar surface.

The protective housing 200 forms, according to the preferred embodiment shown, a cylindrical casing closed around the photographing means 100 and of which one angular portion comprises a window 210 for receiving the protective disk 211. The internal volume of the protective housing 200 is arranged to receive photographing means 100 of any shape. To this end, it is equipped with means 220 for holding said photographing means in position.

In addition, the fact that the protective surface is planar makes it possible to receive any photographing device comprising almost unlimited zooming capabilities.

Its visual field is limited only by the presence of the base 400 or the base of the plate 300 of which the volume does not prevent the objective of the camera from going beyond the horizontal.

According to a particularly advantageous feature of the invention, the arrangement and size of the photographing means 100 with respect to the arrangement and size of the plate 300 and the base 400 (which does not support a dome), which arrangement is defined in particular by the length of the arm at the end of which said photographing means 100 contained in the protective housing 200 are guided in rotation, defining a field of visibility of at least two hundred and seventy degrees. The field of view provided by the device D of the invention therefore defines a partial field of view cut off by a cone of "blindness" corresponding to the presence of the plate 300 and the base 400, which cone has a maximum angle of ninety degrees. Given that, according to the invention, the photographing means 100 are not limited in their zooming capabilities (except by technical considerations), the diameter of said field of view is capable of varying and in particular of increasing.

In addition, as shown and according to the invention, said base is preformed so as not to constitute an obstacle when the camera exceeds the horizontal plane. To do this, its volume was reduced. To this end, the plate 300 supporting the arms 310*a* and 310*b* is preformed with bevelled edges so as to minimise the visual obstacle that it may constitute and thus open the field of vision toward the base. Thus, according to the embodiment shown, the angle of the cone of "blindness" is significantly less than ninety degrees, thus increasing the viewing capabilities of the device D.

The power of the zoom and the resolution capacities of the photographing means 100 are suitable for the precision of the movements that the device D of the invention provides.

To this end, the device D implements features for driving, drive monitoring and specific controls.

Thus, the rotation movements are ensured for each axis by a stepper motor. The rotation movement according to the X-axis is implemented by the motor 320 that is housed in the arm 310*a*. The rotation movement according to axis Y is implemented by the motor 330 that is housed in the plate 300. These stepper motors reach a movement precision on the order of one-tenth of a degree. Similarly, the full speed possible owing to the absence of a stop can reach up to one rotation per second on both axes.

To provide data on the real angular position of the plate according to the Y-axis or of the protective housing according to the X-axis, the rotation movements are monitored for each axis by an encoder. To do this, each motor 320 and 330 moves a pin, respectively 321 and 331, which, by means of a flexible link, provides the rotation of the axis of an encoder, respectively 322 and 332. The encoder makes it possible to return, to the control sub-assembly managing the movements of the device D, the exact angular position taken by the subassemblies at which their axes are kinematically linked. The encoder therefore makes it possible to provide data on the angular position, even if the movement is not generated by the control of the motors (accidental movement, shock, voluntary or involuntary stress on the two axes, etc.).

The presence of encoders makes it possible to use the precision of the positioning of the motors (to the tenth of a degree), which is not possible with the devices of the prior art.

The controls, the supply and the input and output data are transmitted in the region of hinges by means of rotating joints or slip rings 323 and 333. The use of these slip rings eliminates the need for wires, which are capable of disrupting the rotation movements over 360° without stopping, on the two X- and Y-axes of the different sub-assemblies.

All of these features contribute to an optimal use of the velocity capacities in the repositioning of the photographing means 100. The absence of any limitations on the course and the direction of rotation enables the device to choose the shortest angular course for urgent photographing. The data relayed by the encoders makes it possible to perform a possible image inversion.

All of these features also contribute to an optimal use of the zooming capabilities, which are no longer limited by the choice of means for protecting the photographing means.

Nevertheless, the applicant has imagined using the capacities of precision and variation in the focal distance of the photographing means that can effectively be used by the device of the invention, so as to ensure the photographing of elements present in the field of view of the photographing means without moving the latter, which contributes to the efficiency and therefore to an increased lifetime of the subassemblies involved in the movements.

The correspondence between the precision of movement and the precision of the image with the photographing means, of which the resolution is moving toward ten million pixels, makes it possible to envisage the following applications and methods of operation, by means of the electronic sub-assemblies contained in the device:

detection of activity, inactivity of movement,
    monitoring of a detected and/or pre-defined target,
    processing of the image for an area of interest (digital zoom on a portion of the image without motor movement), with a resolution of around five hundred thousand pixels transmitted,
    integrating a legal locking and unlocking function for image hiding, which can be processed either locally (recorder on-board the device), or by a processing device on request by the courts,
    providing on-board day/night functionalities with slow integration of photons associated with a slow movement of the photographing device (for example a rotation lasting several hours).

The arm 310*b* forms a free volume capable of containing the aforementioned electronic sub-assemblies.

The protective window enclosing the protective housing of the device of the invention requires regular cleaning, as in the devices of the prior art. The applicant's research has resulted in the design of a particularly suitable automatic cleaning device.

According to the invention, said plate 300 includes, at the level of the base of the arm 310*a*, at least one cleaning means 500. According to the embodiment shown, these cleaning means 500 are located between the two arms 310*a* and 310*b*. Thus, the cleaning can be performed when the protective housing 200 performs a rotation so as to direct the window 210 toward the cleaning means, i.e. in this case when the window 320 passes between the base of the two arms 310*a* and 310*b*.

Figure 4:
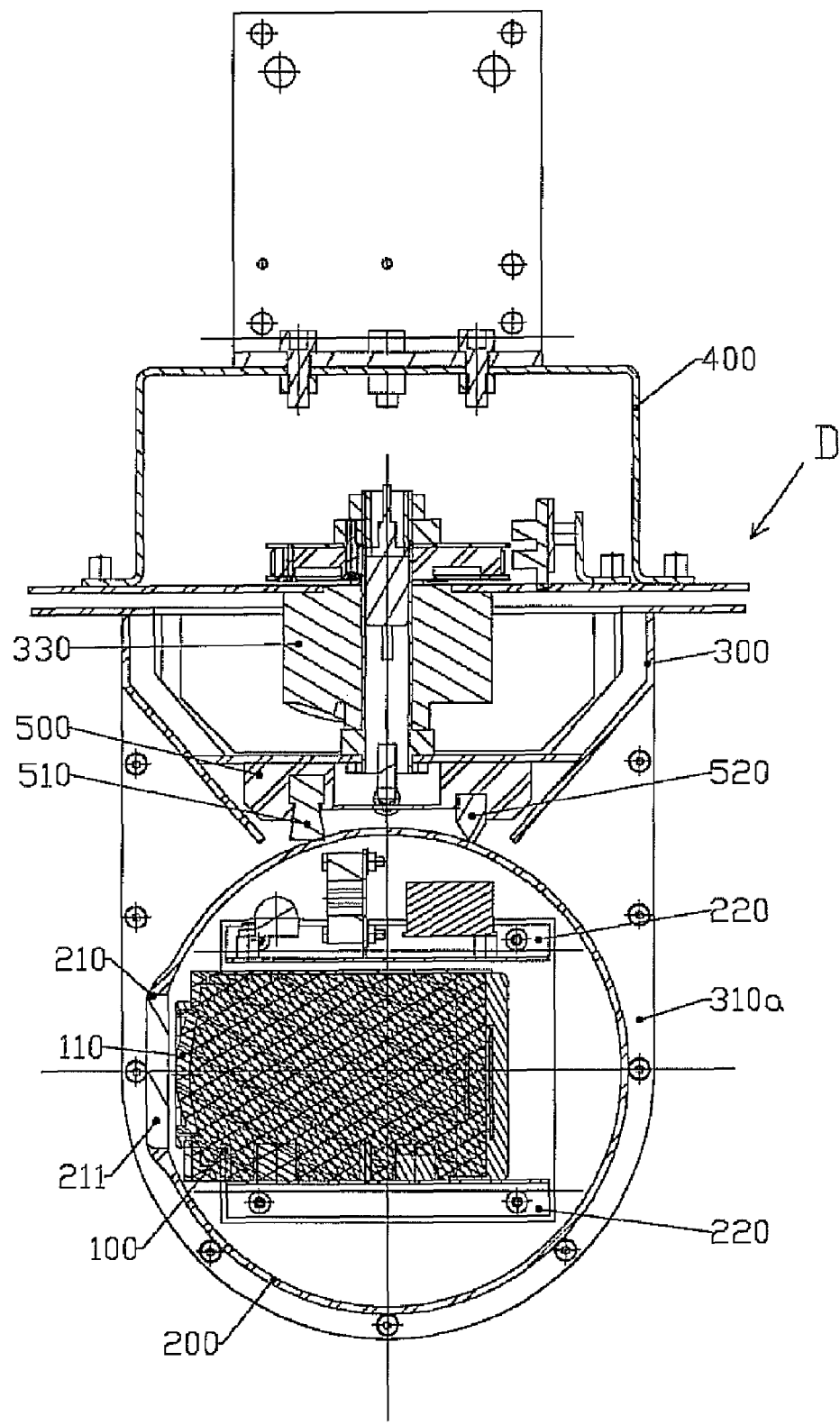
FIG. 4 is a diagrammatic drawing of a side cross-section view according to the cutting plane B-B shown in FIG. 1.
Figure 5:
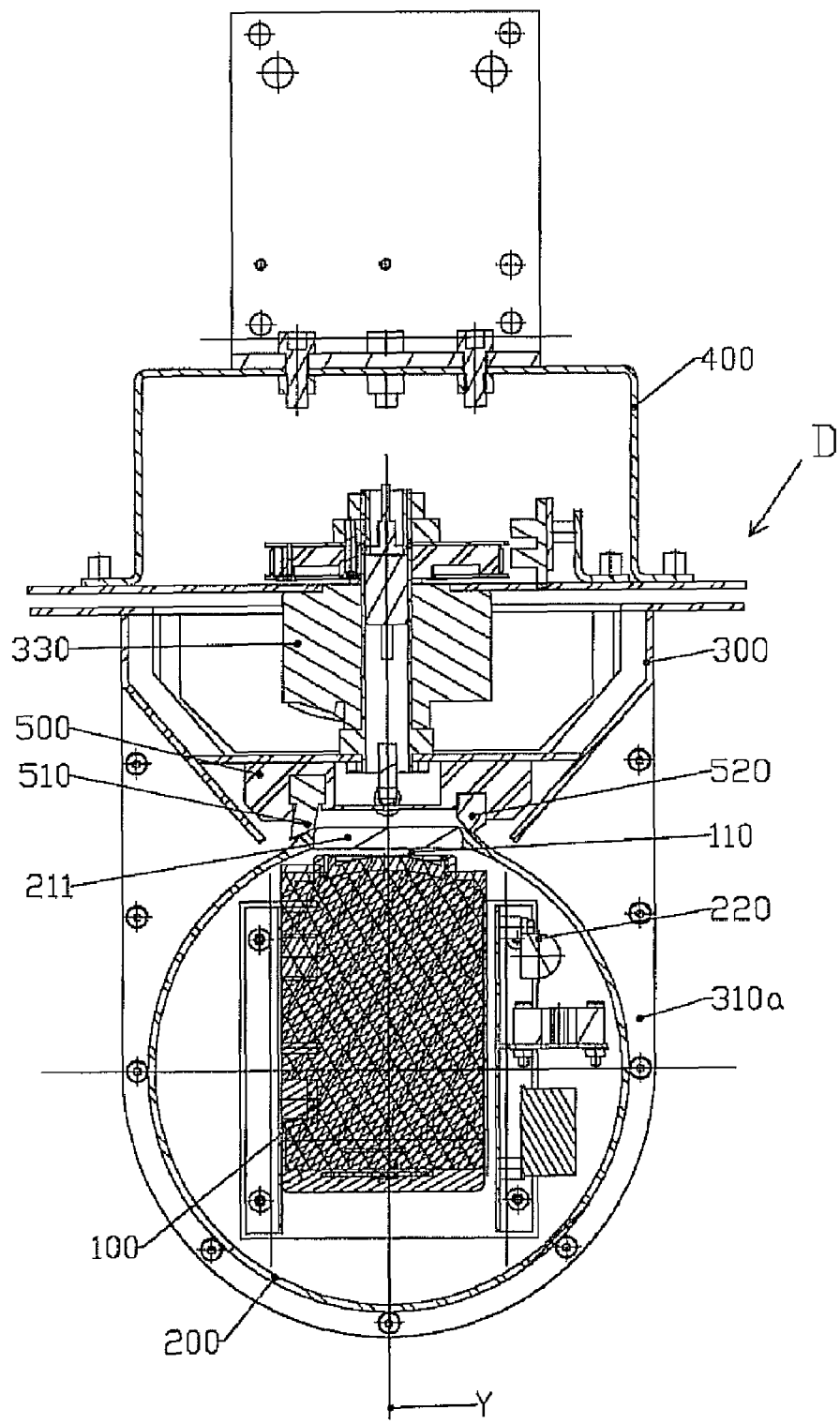
FIG. 5 is a diagrammatic drawing according to the view shown in FIG. 4 with a different protective housing position.

The cleaning means 500 can be constituted by a projection nozzle for cleaning fluid (such as a liquid or pulsed air), which may or may not be associated with rubbing means as shown in FIG. 4.

These rubbing means are constituted by a brush 510 and by a rubbing lip or a rubber strip such as a windshield-wiper lip. As shown, a rotation of the protective housing 200 according to its X-axis enables the window 210 to be brushed and/or wiped or vice-versa according to the direction of rotation, and, when the rotation is complete, it stops between the brush 510 and the wiper 520 in the position shown in FIG. 5. The device D of the invention therefore has particularly effective cleaning means not requiring external intervention.

According to another particularly advantageous feature of the invention, the base of the arm is used in another manner. Indeed, as shown, said plate 300 is equipped at the base of the arm, with projecting elements coming into contact with said rotating housing 200 and forming with the external surface of the latter an enclosed volume. According to the embodiment shown, these projecting elements are constituted by said brush 510 and said wiper 520, which, when the window 210 is directed toward the base of the arms 310*a* and 310*b*, frame and protect said window 210 in the enclosed volume, in the position shown in FIG. 5.

On this basis, the applicant has imagined a method of operation that is remarkable in that it consists of rotating the housing so as to bring the viewing window 210 and the pane 211 closing it into said enclosed volume so as to protect them.

This self-protective movement can be caused by any event predetermined by the operator, such as, for example, the detection of weather conditions preventing proper operation of the device. Similarly, the optical detection of an element moving at high speed toward the objective of the photographing means can also cause said movement.

According to the embodiment shown, the arms and the protective housing are preformed so that the ends of the arms reproduce the diameter of the protective housing 200. The device D thus adopts, at its mobile end, a compact, aerodynamic configuration not having shoulders, projecting elements or crevices.

It is understood that the device and its methods of operation, which have been described and shown above, have been done so for the purpose of disclosure rather than as a limitation. Of course, various arrangements, modifications and improvements can be made to the example above, without going beyond the scope of the invention.

For example, although the embodiment shows a device with a protective housing receiving a single photographing means, the features described above also apply to housings arranged to receive a plurality of photographing means, possibly of different technologies that may or may not be associated with at least one sensor.

The invention claimed is:

1. A device providing the control and movement of a camera, the device comprising:
   a stationary base;
   a plate;
   an arm integrated with the plate;
   a housing configured to form a protective chamber around the camera, wherein the housing is mounted mobile in rotation along a first axis with respect to the arm, wherein the device further includes
   a first slip ring between the housing and the arm, the first slip ring defining radii in a first plane, wherein the plate is mounted mobile in rotation along a second axis with respect to the stationary base, wherein the second axis is perpendicular to the first axis, wherein the device further includes
   a second slip ring between the plate and the stationary base, the second slip ring defining radii in a second plane, the second plane being perpendicular to the first plane, wherein a supply for the camera is transmitted in the first and second slip rings and wherein the two rotation movements occur over three hundred and sixty degrees without stopping, with the arrangement and the size of the plate and the base with respect to the arrangement and size of the camera defining a field of visibility of at least two hundred and seventy degrees,
   wherein the housing defines a window for the photographing means, and the plate includes a cleaning mechanism including a first member and a second member, the first member and second member being configured to frame the window such that the window, first member, and second member define an enclosed volume having straight edges.

2. A device according to claim 1, characterised in that said protective housing receives a plurality of cameras of different technologies.

3. A device according to claim 1, characterised in that said protective housing receives a plurality of cameras.

4. A device according to claim 1, characterised in that said protective housing receives a plurality of cameras and is equipped with a plurality of windows.

5. A device according to claim 1, characterised in that said protective housing receives a sensor associated with the camera.

6. A device according to claim 1, characterised in that the plate supporting the arms is preformed with bevelled edges so as to minimise the visual obstacle that it may constitute.

7. A device according to claim 1, characterised in that the rotation movements are provided for each axis by a stepper motor.

8. A device according to claim 1, characterised in that the rotation movements are monitored for each axis by an encoder.

9. A device according to claim 1, characterised in that said protective housing includes a window in front of which the objective of the camera is installed, which window is closed by a plate of transparent material.

10. A device according to claim 1, characterised in that the controls, and the input and output data for the camera are transmitted in the first and second slip rings.

11. A device according to claim 1, characterised in that said plate includes two arms between which said protective housing rotates.

12. A device according to claim 1 wherein the device is configured to cause the protective housing to rotate so as to bring the protected window to the cleaning mechanism in order to perform the cleaning of the protected window.

13. A device according to claim 1 wherein the device is configured to integrate a legal locking and unlocking function for image hiding, which can be processed either locally (recorder on-board the device), or by a processing device on request by the courts.

14. A device providing the control and movement of a camera, the device comprising:
   a stationary base;
   a plate;
   an arm integrated with the plate;
   a housing configured to form a protective chamber around the camera, wherein the housing is mounted mobile in rotation along a first axis with respect to the arm, wherein the device further includes
   a first slip ring between the housing and the arm, the first slip ring defining radii in a first plane, wherein the plate is mounted mobile in rotation along a second axis with respect to the stationary base, wherein the second axis is perpendicular to the first axis, wherein the device further includes
   a second slip ring between the plate and the stationary base, the second slip ring defining radii in a second plane, the second plane being perpendicular to the first plane, wherein a supply for the camera is transmitted in the first and second slip rings and
   wherein the two rotation movements occur over three hundred and sixty degrees without stopping, with the arrangement and the size of the plate and the base with respect to the arrangement and size of the camera defining a field of visibility of at least two hundred and seventy degrees, characterised in that the plate is equipped at the base of the arm with projecting elements coming into contact with the rotating housing and forming with the external surface of the latter an enclosed volume having straight edges.

15. A device according to claim 14 wherein the device is configured to rotate the housing so as to bring the window into the enclosed volume so as to protect the widow, in response to detection of an object moving toward the camera.

* * * * *